United States Patent
Xu et al.

(10) Patent No.: US 7,072,341 B2
(45) Date of Patent: Jul. 4, 2006

(54) REAL TIME STREAMING MEDIA COMMUNICATION SYSTEM

(75) Inventors: Charles Xu, Santa Clara, CA (US); Paul Pay-Lun Ju, Cupertino, CA (US); Hu-Hua Liu, Scarsdale, NY (US); Chen-Huei Chang, Milpitas, CA (US); Shih-An Cheng, Cupertino, CA (US)

(73) Assignee: Innomedia PTE, LTD, Singapore (SG)

( * ) Notice: Subject to any disclaimer, the term of this patent is extended or adjusted under 35 U.S.C. 154(b) by 917 days.

(21) Appl. No.: 10/077,510

(22) Filed: Feb. 15, 2002

(65) Prior Publication Data

US 2002/0114333 A1 Aug. 22, 2002

Related U.S. Application Data

(63) Continuation-in-part of application No. 09/788,865, filed on Feb. 20, 2001, and a continuation-in-part of application No. 09/819,492, filed on Mar. 28, 2001, now Pat. No. 6,928,082, and a continuation-in-part of application No. 09/977,438, filed on Oct. 15, 2001.

(51) Int. Cl.
*H04L 12/56* (2006.01)
*H04L 12/66* (2006.01)

(52) U.S. Cl. ............... 370/392; 370/353; 370/354; 370/356; 370/401

(58) Field of Classification Search ............ 370/401, 370/466, 475, 471, 392, 389; 709/220, 227
See application file for complete search history.

(56) References Cited

U.S. PATENT DOCUMENTS

| 5,799,068 A | 8/1998 | Kikinis et al. |
| 5,916,302 A | 6/1999 | Dunn et al. |
| 6,075,783 A | 6/2000 | Voit |

(Continued)

FOREIGN PATENT DOCUMENTS

EP 0781 015 A 6/1997

(Continued)

OTHER PUBLICATIONS

Alan B. Johnston, SIP, Understanding the Session Initiation Protocol, 2001, pp. 0-52.

*Primary Examiner*—Ricky Q. Ngo
*Assistant Examiner*—Venkatesh Haliyur
(74) *Attorney, Agent, or Firm*—Timothy P. O Hagan

(57) ABSTRACT

A device provides for sending datagrams representing real time streaming media frames to a client independent of whether the client is served by a network address proxy. The device receives a datagram originated by the client that includes an indicated network address and an indicated port number for receipt of the datagrams representing real time streaming media frames, extracts a source network address and a source port number from the datagram originated by the client, and compares the indicated network address to the source network address. The device addresses the datagrams representing real time streaming media frames to the source network address and source port number if the indicated network address and the source network address are not the same.

12 Claims, 11 Drawing Sheets

U.S. PATENT DOCUMENTS

| | | |
|---|---|---|
| 6,321,253 B1 | 11/2001 | McKeen et al. |
| 6,360,265 B1 * | 3/2002 | Falck et al. ............... 709/227 |
| 6,731,642 B1 * | 5/2004 | Borella et al. ............. 370/401 |
| 6,822,957 B1 * | 11/2004 | Schuster et al. ........... 370/389 |
| 2002/0103898 A1 * | 8/2002 | Moyer et al. ............... 709/224 |
| 2002/0141389 A1 | 10/2002 | Fangman et al. |
| 2003/0016664 A1 * | 1/2003 | MeLampy et al. ......... 370/389 |
| 2003/0048780 A1 * | 3/2003 | Phomsopha ................ 370/389 |
| 2004/0252683 A1 | 12/2004 | Kennedy et al. |

FOREIGN PATENT DOCUMENTS

| | | |
|---|---|---|
| EP | 0841 831 A | 5/1998 |
| EP | 0966 145 A | 2/1999 |

* cited by examiner

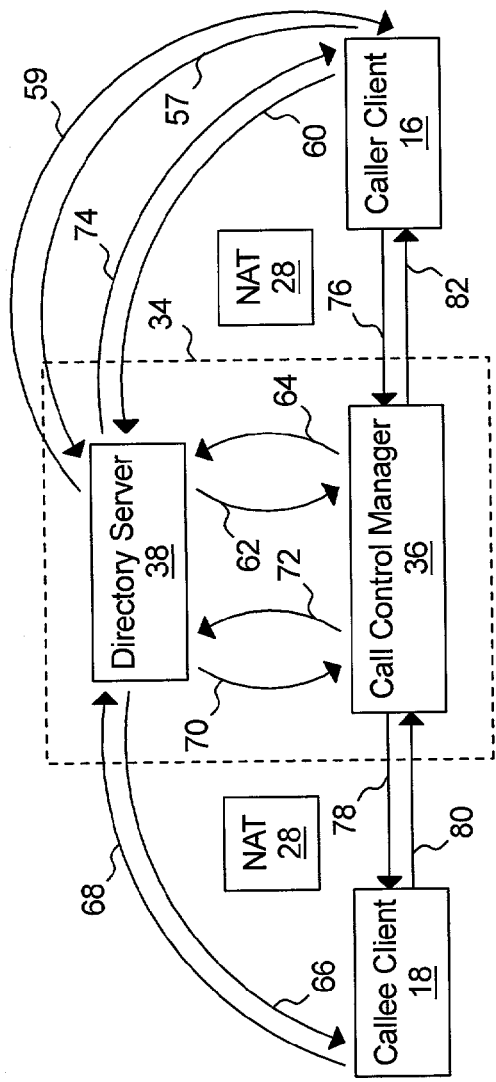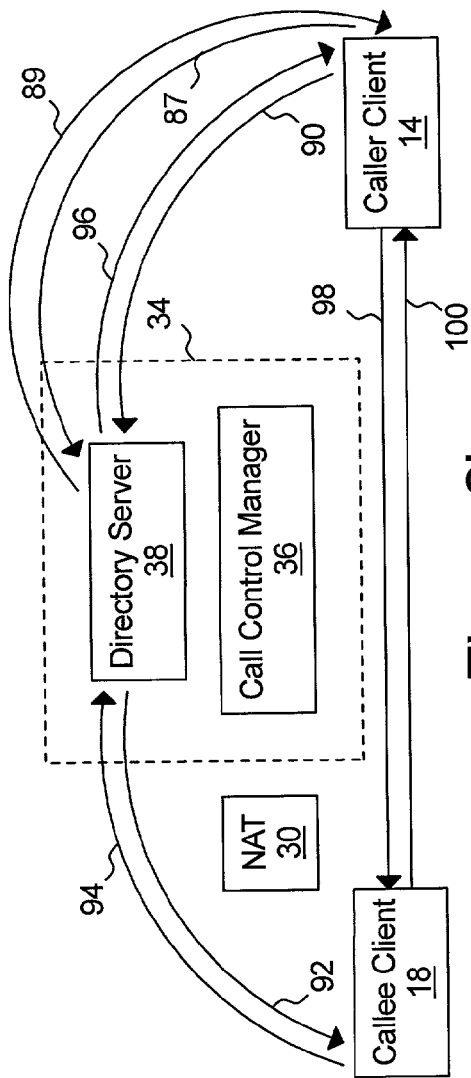
Figure 2a
Figure 2b

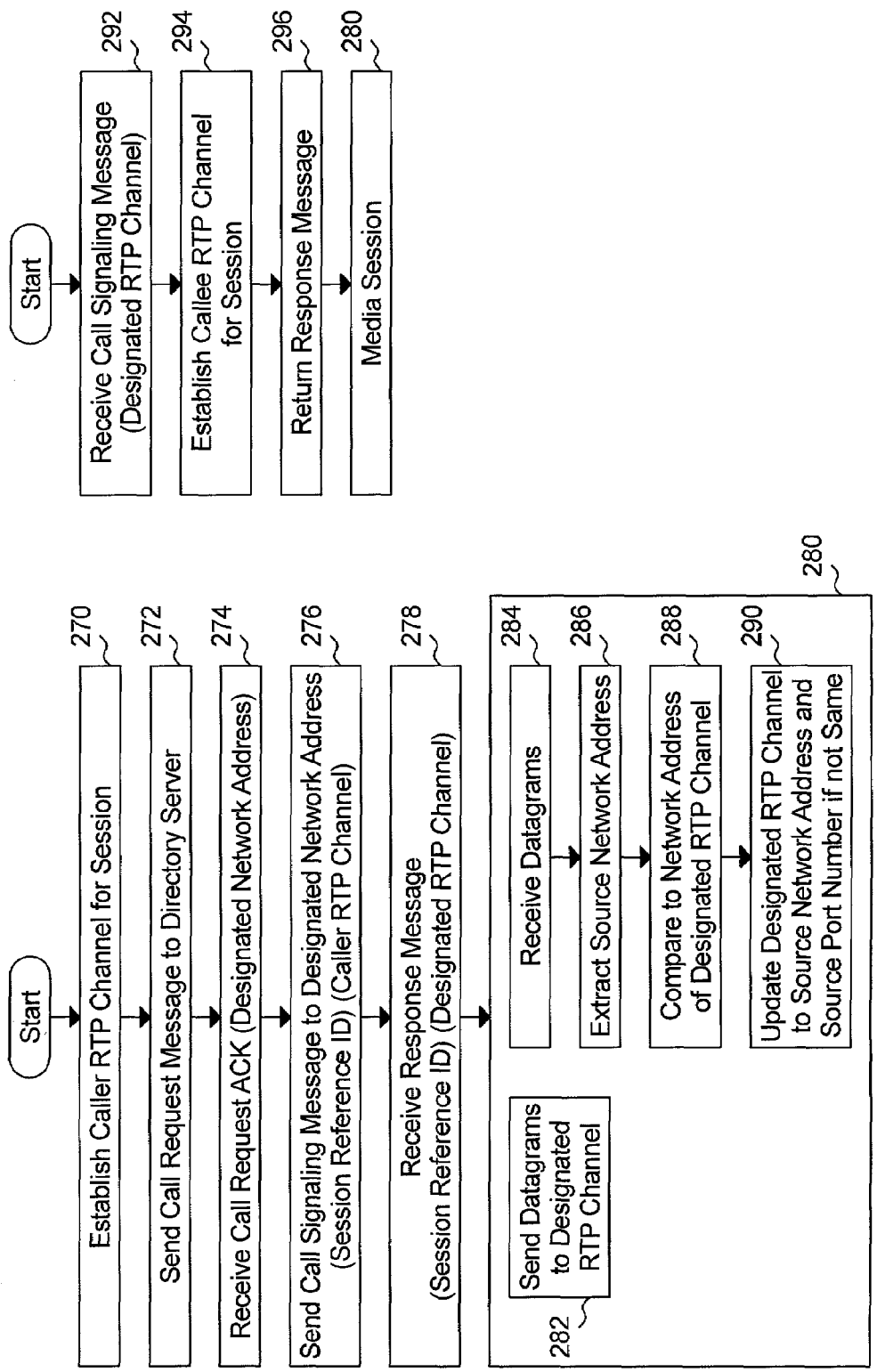

REAL TIME STREAMING MEDIA COMMUNICATION SYSTEM

CROSS REFERENCE TO RELATED APPLICATIONS

The present application is a continuation-in-part of U.S. patent application Ser. No. 09/788,865, entitled Method for Communicating Audio Data in a Packet Switched Network, filed on Feb. 20, 2001; is a continuation-in-part of U.S. patent application Ser. No. 09/819,492, entitled System and Method for Determining a Connectionless Communication Path for Communicating Audio Data through an Address and Port Translation Device, filed on Mar. 28, 2001 now U.S. Pat. No. 6,928,082; and is a continuation-in-part of U.S. patent application Ser. No. 09/977,438, entitled System and Method For Providing Real Time Connectionless Communication of Media Data Through a Firewall, filed on Oct. 15, 2001. The above referenced patent applications are incorporated herein in their entirety.

TECHNICAL FIELD

The present invention relates to communicating media data in a packet switched data network and, more specifically, to establishing and maintaining real time media data sessions through a firewall.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each telephone handset is coupled to a local switching station on a dedicated pair of copper wires known as a subscriber loop. When a telephone call is placed, the circuit is completed by dynamically coupling each subscriber loop to a dedicated pair of copper wires between the two switching stations.

More recently, the copper wires, or trunk lines between switching stations have been replaced with fiber optic cables. A computing device digitizes the analog signals and formats the digitized data into frames such that multiple conversations can be transmitted simultaneously on the same fiber. At the receiving end, a computing device reforms the analog signals for transmission on copper wires. Twisted pair copper wires of the subscriber loop are still used to couple the telephone handset to the local switching station.

More recently yet, voice telephone service has been implemented over the Internet. Advances in the speed of Internet data transmissions and Internet bandwidth have made it possible for telephone conversations to be communicated using the Internet's packet switched architecture and the TCP/IP protocol.

Software is available for use on personal computers which enable the two-way transfer of real-time voice information via an Internet data link between two personal computers (each of which is referred to as an end point or client). Each end point computer includes appropriate hardware for driving a microphone and a speaker. Each end point operates simultaneously both as a sender of real time voice data and as a receiver of real time voice data to support a full duplex voice conversation. As a sender of real time voice data, the end point computer converts voice signals from analog format, as detected by the microphone, to digital format. The software then facilitates data compression down to a rate compatible with the end point computer's data connection to an Internet Service Provider (ISP) and facilitates encapsulation of the digitized and compressed voice data into a frame compatible with the user datagram protocol and internet protocol (UDP/IP) to enable communication to the other end point via the Internet.

As a receiver of real time voice data, the end point computer and software reverse the process to recover the analog voice information for presentation to the operator via the speaker associated with the receiving computer.

To promote the wide spread use of Internet telephony, the International Telephony Union (ITU) had developed a set of standards for Internet telephony. The ITU Q.931 standard relates to call signaling and set up, the ITU H.245 standard provides for negotiation of channel usage and compression capabilities between the two endpoints, and the ITU H.323 standard provides for real time voice data between the two end points to occur utilizing UDP/IP to deliver the real time voice data.

Additionally, the Internet Engineering Task Force (IETF) has developed a set of standards for initiating real time media data sessions known as the Session Initiation Protocol (SIP). SIP provides for UDP/IP messages to be exchanged between the two endpoints (or between the two endpoints and multiple proxy servers) to provide for call signaling and negotiation of compression capabilities.

A problem associated with standard ITU Internet telephony and with SIP Internet telephony is that network address translation (NAT) firewalls prevent the transmission of UDP/IP frames from an endpoint computer outside the firewall to an endpoint computer on a private network inside the firewall.

More specifically, both the ITU Internet telephony standards and the SIP standards provide for each endpoint to designate a real time transport protocol (RTP) channel, which comprises an IP address and port number, for receipt of media datagrams and to provide that RTP channel to the other end point.

Because the private network client does not have a globally unique IP address, a frame sent to such non-globally unique IP address can not be routed on the Internet and will be lost. Further, even if the private network client were able to identify and designate the IP address of the NAT firewall, the private network client has no means for establishing a port on the NAT firewall for receipt of media datagrams.

Because of the wide spread use of NAT firewalls which typically provide both IP address translation and port translation of all frames sent from the private network to the Internet, what is needed is a system and method for establishing and maintaining Internet telephony conversations between two clients, both of which are located on private networks behind NAT firewalls. What is also needed is a system and method for establishing and maintaining Internet telephone conversations between a client located on a private network behind a NAT firewall and a client with an Internet routable IP address (e.g. public IP address on the Internet) that operates a receiving UDP channel that is different from its sending UDP channel.

SUMMARY OF THE INVENTION

A first aspect of the present invention is to provide a device for sending datagrams representing real time streaming media frames to a client independent of whether the client is served by a network address proxy. The device comprises means for receiving a datagram originated by the client that includes an indicated network address and an indicated port number for receipt of the datagrams representing real time streaming media frames, means for extracting a source network address and a source port number from the datagram originated by the client, means for comparing the indicated network address to the source network address.

The device addresses the datagrams representing real time streaming media frames to the source network address and source port number if the indicated network address and the source network address are not the same. And, the device addresses the datagrams representing real time streaming media frames to the indicated network address and the indicated port number if the indicated network address and the source network address are the same.

A second aspect of the present invention it to provide a device for sending datagrams representing real time streaming frames to a client independent of whether the client is served by a network address proxy. The device comprises means for receiving a datagram originated by the client that includes an indicated network address and an indicated port number for receipt of the datagrams representing real time streaming media frames and means for establishing a destination network address and destination port number for sending the datagrams representing real time streaming media frames to the client. The destination network address and destination port number being the indicated network address and the indicated port number respectively if the indicated network address matches a source network address extracted from the datagram. And, the destination network address being a source network address and a source port number extracted from the datagram if the indicated network address does not match the source network address.

A third aspect of the present invention is to also provide a device for sending datagrams representing real time streaming frames to a client independent of whether the client is served by a network address proxy. The device comprises means for receiving a session set up datagram originated by the client that includes an indicated network address and an indicated port number for receipt of the datagrams representing real time streaming media frames, means for receiving a session datagram originated by the client, and means for establishing a destination network address and destination port number for sending the datagrams representing real time streaming media frames to the client. The destination network address and destination port number being the indicated network address and the indicated port number respectively if the indicated network address matches a source network address extracted from the session datagram. And, the destination network address and port number being a source network address and a source port number extracted from the datagram if the indicated network address does not match the source network address extracted from the session datagram.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIGS. 2a and 2b are block diagrams representing call set up messaging in accordance with one embodiment of the present invention;

FIGS. 9a and 9b are flow charts showing exemplary operation of a client in accordance with one embodiment of the present invention.

DETAILED DESCRIPTION OF THE EXEMPLARY EMBODIMENTS

Figure 1:
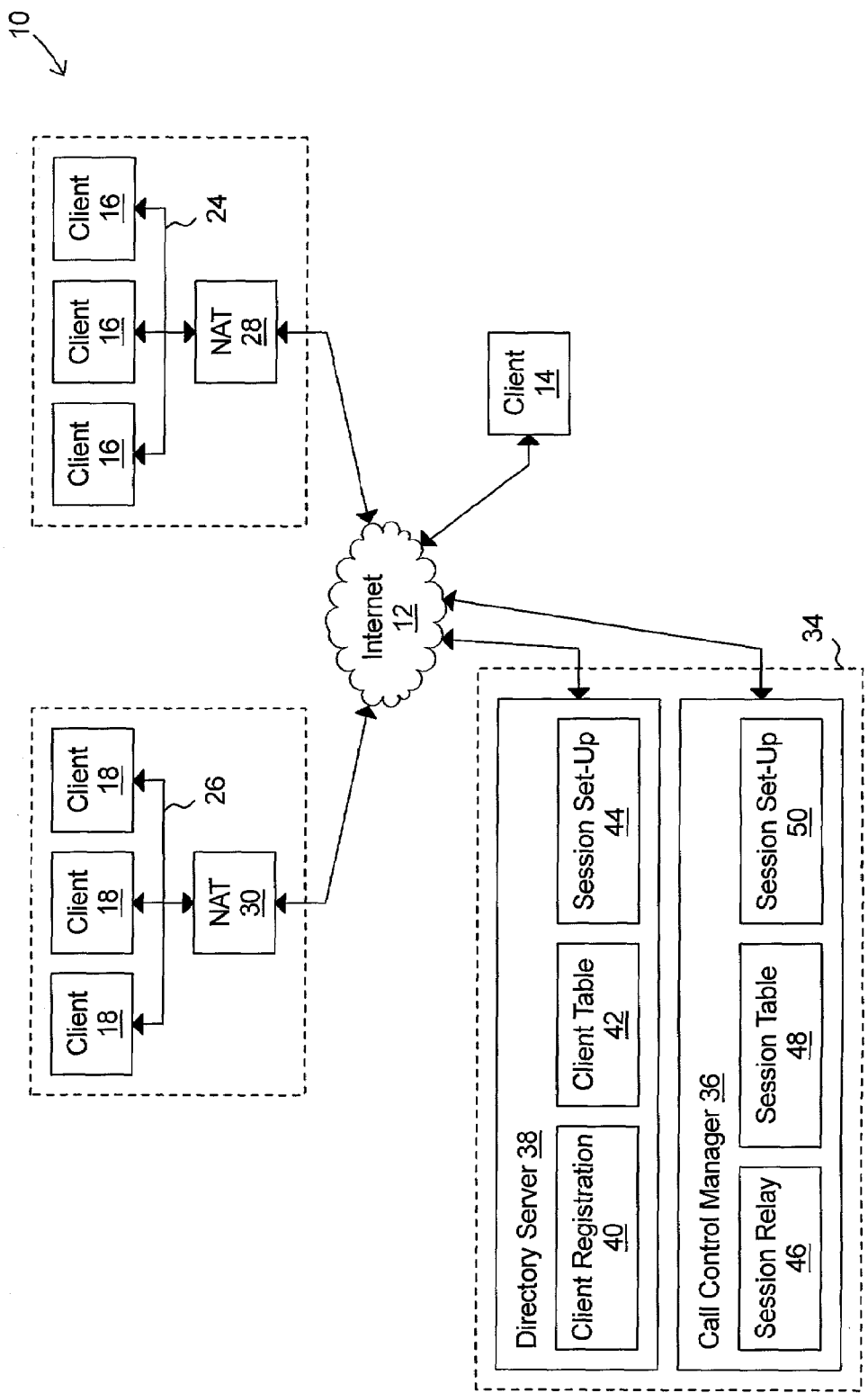
FIG. 1 is a block diagram of a real time media communication network in accordance with one embodiment of this invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

Referring to FIG. 1, a block diagram of a real time media communication network 10 is shown. The real time media communication network 10 includes a network 12 interconnecting a plurality of network devices. The network 12 may be the Internet. Throughout this application, the network 12 may be referred to as the "Internet", however, it should be appreciated this is for illustrative purposes only and does not limit the network 12 to the Internet or similar networks.

Coupled to the Internet 12 are a plurality of network devices which for purposes of this invention includes a real time media communication client 14, network address translation proxy servers 28 and 30, each operating as a firewall for private networks 24 and 26 respectively, and a telephony service provider 34 that includes a directory server 38 and a call control manager 36.

Each of the network devices operates a suite of IP protocols that enable the device to set up TCP/IP logical connections and/or UDP/IP channels with other network devices over the Internet 12. Each device is assigned a public Internet Protocol (IP) address and IP datagrams are communicated between the various devices utilizing each device's IP network address for routing the datagrams from the source device to the destination device.

Each network address translation proxy 28 and 30 may be a network address translation (NAT) server that operates as an IP layer proxy for clients 16 and 18 that are coupled to each of a private networks 24 and 26 respectively. Throughout this application, the network address translation proxy 28 and 30 may be referred to as a "NAT Server", however, it should be appreciated this is for illustrative purposes only and does not limit the structure to that of a traditional NAT server.

Each private network 24 and 26 may function in a similar manner to the Internet 12 using the IP protocols for routing datagrams between the clients 16 and 18 and its respective NAT server 28 and 30. However, the IP network address assigned to each client 16 or 18 on the private network may be an address selected from a class of IP network addresses reserved for private networks and the IP network address assigned to each client 16 or 18 may be the same as the address assigned to another client on another private network. Datagrams with an IP address within the private network class are routable on the private network but are not routable on the Internet 12. Datagrams with an IP address that is globally unique (routable on the Internet 12) are routable on the private network but are always routed to the NAT server 30 or 28 which in turn proxies the datagram on the Internet. More specifically, the NAT server 28 or 30 emulates the destination device when opening a connection and communicating datagrams with the initiating device on the private network and operates as an IP layer proxy, by performing both address translation and port translation, to open a connection and exchange data with the destination device, on behalf of the initiating device, over the Internet 12.

The NAT server 28 and 30 may also be capable of translating connectionless datagrams sent by the initiating device on the private network by performing both address translation, port translation, and sending the connectionless datagrams to the destination device over the Internet 12. And, if a connectionless datagram were to be replied to by the destination device and the reply datagram is: 1) received at the NAT server on the same port number as the NAT server utilized when translating the connectionless datagram; 2) includes a source network address and port number which matches the destination network address and port number of the connectionless datagram sent by the NAT server; and 3) is received within a predefined time window following when the NAT server sent the connectionless datagram, then the response datagram may be routed back to the initiating device on the private network.

To enable reverse translation of datagrams received on the Internet, the NAT server may maintain a translation table that maps the source address and port number of the initiating device to the corresponding translated source address and port number of the NAT server for each TCP/IP connection opened (and UDP/IP connectionless datagram sent) by NAT server on the Internet. As such, the NAT server may utilize the translation table to relay a reply frame received over the Internet 12 back to the appropriate initiating device by looking up the initiating device network address and port number that is associated with the port number on which the NAT server received the reply datagram on the Internet 12.

For added security, each entry in the translation table may also include the destination network address and port number to which the translated frame was sent over the Internet 12. As such, the NAT server may verify that a reply frame is truly a reply frame from the device to which the translated frame was sent by comparing the source address and port number of the reply frame to the destination network address and port number to which the translated frame was sent.

The telephone service provider 34, or more specifically the directory server 38 and the call control manager 36, enable the signaling and maintenance of real time streaming media sessions between a caller client and a callee client, each of which is selected from the group of clients 14, 16, and 18, independent of whether the caller client and/or the callee client is operating on a private network 24 or 26 and served by a NAT server 28 or 30. More specifically, the directory server 38 and the call control manager 36 enable client 14 operating as a caller client to signal a real time streaming media session to either of clients 16 or 18 operating on private networks 24 and 26 respectively and, enable either of clients 16 or 18 operating as a caller client to signal and maintain a real time streaming media session with another of clients 14, 16 or 18.

The directory server 34 facilitates signaling a media session. Human operators are accustomed to working with 10-digit telephone numbers which, once assigned to a person, remain relatively stable. However, each client 14, 16, and 18 coupled to the Internet 12 or to a private network 24 or 26 is addressed via a 12-digit network address which may change each time the device logs onto a network. Therefore, the directory server 34 maintains a client table database 42 that associates each client 14, 16, and 18 to a client identifier that is stable and to a network address currently assigned to the client. As such, the caller client may quarry the directory server 34 identifying a callee client by its stable client identifier to obtain a network address for signaling the callee client.

Each of NAT server 28 and 30 prevents a caller client from directly signaling a callee client 16 or 18 on its private network 24 or 26 because it can only reverse translate a datagram that is a reply to a datagram initiated by a client 16 or 18 respectively. A call signaling message to initiate a media session is a first message originated by a caller client to initiate a media session and therefore can not be a reply to a message originated by the callee client to the caller client. Therefore, the directory server 34 also maintains an open channel to each client 16 or 18 that is located on a private network. More specifically, the client 16 or 18 periodically sends a ping datagram to the directory server 34 such that its NAT server 28 or 30 respectively translates the datagram and writes an applicable entry to its translation table. The directory server 34 extracts the source network address and source port ID number from each ping datagram. Because the NAT server can reverse translate a datagram sent from the directory server 34 to the extracted source network address and source port number, such extracted source network address and source port number identify the open channel until the next ping datagram from the client is received. Therefore, the directory server 34 may relay a call signaling message form a caller client to a callee client on the open channel even if the callee client is operating on a private network.

After the session signaling has been complete and the media session has begun, the call control manager 36 facilitates communication of real time media data during the session between the caller client and the callee client when both the caller client and the callee client are on a private network 24 or 26. As discussed, because a NAT server can not reverse translate a datagram unless it is in response to a datagram originated by a client, it is impossible for client 16 on private network 28 to initiate sending datagrams to client 18 because NAT server 30 will not reverse translate and it is impossible for client 18 to initiate sending datagram to client 16 because NAT server 28 will not reverse translate. However, both clients 16 and 18 may initiate sending datagrams to the call control manager 36 and the call control manager 36 operates as a relay there between. Further, the call control manager 36 can extract a source network address and a source port number from datagrams originated by client 18 (and translated by NAT server 30) to identify a destination network address and port number to which datagrams can be sent as response datagrams that are reverse translatable by the NAT server 30. The response datagrams include the real time steaming media data received from client 16. Similarly, the call control manager 36 can extract a source network address and a source port number from datagrams originated by client 16 (and translated by NAT server 28) to identify a destination network address and port number to which datagrams can be sent as response datagrams that are reverse translatable by the NAT server 28. The response datagrams include the real time media session data received from client 18.

FIG. 2a represents signaling a media session and relaying of real time streaming media data between caller client 16 that is served by the NAT server 28 and callee client 18 that is served by the NAT server 30 utilizing the directory server 38 and the call control manager 36.

Signal 57 represents the caller client 16 originating a call request message to the directory server 38 to obtain a network address for signaling the callee client 18. The call request message will identify the callee client by its stable client identifier.

Signal 59 represents the directory server 38 responding to the caller client 16, on the open channel to the caller client 16, with a call request acknowledge signal that includes a network address to utilize for signaling the callee client 18. Because the callee client 18 is on the private network 30 and can not be directly signaled, the network address in the call request acknowledge message will be the network address of the directory server 38.

Signal 60 represents the caller client 16 originating a media session signaling message to the directory server 38 that includes the session identifier and a real time transport protocol channel (caller client RTP channel) established by the caller client 16 for receipt of media datagrams during the media session. Signal 62 represents the directory server 38 passing the media session signaling message to the call control manager 36. Signal 64 represents the call control manager returning a call signaling message to the directory server 38 that include a real time transport protocol channel established by the call control manager 36 for receipt of media datagrams during the session (CCM RTP channel) substituted for the caller client RTP channel. Signal 66 represents the directory server sending the call signaling message that was received from the call control manager 26 to the callee client 18 on the open channel to the callee client 18. It should be appreciated that because the caller client 16 is located on private network 24, the caller client RTP channel will include a network address that is local to private network 24 and is unrouteable on the Internet 12. However, the CCM RTP channel will include a network address that is globally unique.

Signal 68 represent the callee client 18 generating a response message back to the directory server 38 that includes a callee client RTP channel that is established by the callee client 18 for receipt of media datagrams during the session. Again, the callee client RTP channel will include a network address that is unrouteable on the Internet 12. Signal 70 represents the directory server 38 passing the response message to the call control manager 36 and signal 72 represents the response message back from the call control manager 36 that includes the CCM RTP channel substituted for the callee client RTP channel. Signal 74 represents the directory server passing the response signal to the caller client on the open channel to the caller client 16.

Thereafter, the session starts and the caller client 16 and the callee client 18 each begin sending media session datagrams encapsulating real time streaming media frames to the call control manager 36 on the CCM RTP channel as represented by signals 76 and 80 respectively. The call control manager 36 extracts the source network address and source port number from datagrams received from each of the caller client 16 and the callee client 18 during the session to determine a destination network address and destination port number to each of the caller client 16 and the callee client 18. The call control manager 36 then relays the datagrams received from the caller client 16 to the callee client 18 utilizing the destination network address and destination port number as extracted from datagrams originated by the callee client 18 and relays datagrams received from the callee client 18 to the caller client 16 utilizing the destination network address and destination port number as extracted from datagrams originated by the caller client 16.

FIG. 2b represents signaling a media session and communication real time streaming media data between a caller client 14 that has a globally unique network address and a callee client 18 served by NAT server 30.

Signal 87 represents the caller client 14 originating a call request message to the directory server 38 to obtain a network address for signaling the callee client 18. The call request message will identify the callee client 18 by its stable client identifier.

Signal 89 represents the directory server 38 responding to the caller client 14 with a call request acknowledge signal that includes a network address to utilize for signaling the callee client 18. Because the callee client 18 is on the private network 30 and can not be directly signaled, the network address in the call request acknowledge message will be the network address of the directory server 38.

Signal 90 represents the caller client 14 originating a call signaling message to the directory server 38 that includes the session identifier and a caller RTP channel established by the caller client 14 for receipt of media datagrams during the media session. Signal 92 represents the directory server 38 passing the call signaling message to the callee client 18 on the open channel to the callee client 18.

Signal 94 represent the callee client 18 generating a response message back to the directory server 38 that includes a callee RTP channel established by the callee client 18 for receipt of media datagrams during the media session. Signal 96 represents the directory server 38 passing the response message to the caller client 14.

Thereafter, the callee client 18 begins originating datagrams encapsulating real time streaming media frames to the caller client 14 on the caller RTP channel as represented by signal 100. The caller client 14 extracts the source network address and source port number from datagrams received from the callee client 18 to use as a destination network address and destination port number for sending datagrams to the callee client 18 as represented by signal 98.

Directory Server

Figure 3A:
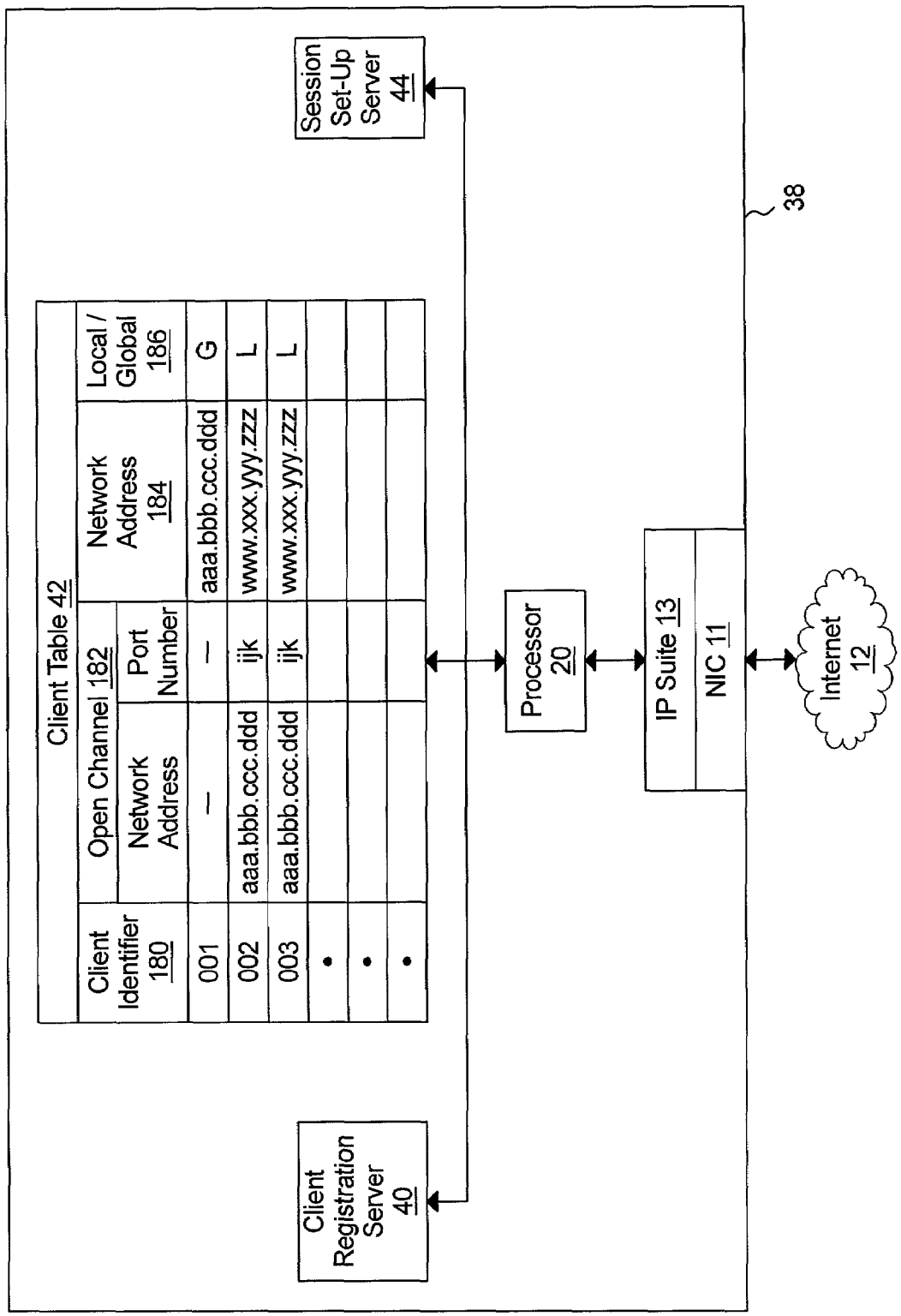
FIG. 3a is a block diagram of a directory server in accordance with one embodiment of the present invention.

FIG. 3a is a block diagram representing an exemplary directory server 38. The directory server 38 may be embodied in typical server hardware that includes a processor 20 for operating a client registration server application 40, a client table database 42, and a session set up server application 44 as well as operating an IP suite 13 and a network interface circuit 12 for communicating with other devices coupled to the Internet 12. It should be appreciated that the structure and functionality of each of the client registration server application 40, the client table database 42, and the session set up server application 44 may be embodied in a single application or distributed across multiple applications operating on the directory server hardware.

The client table database 42 associated each client, as identified by its unique client identifier 180, to its current network address 184 and to the current open channel to the client 182. The client table database 42 also includes a global/local indicator 186 that indicates whether the current network address 184 is a local network address "L" or a globally unique network address "G".

Figure 4B:
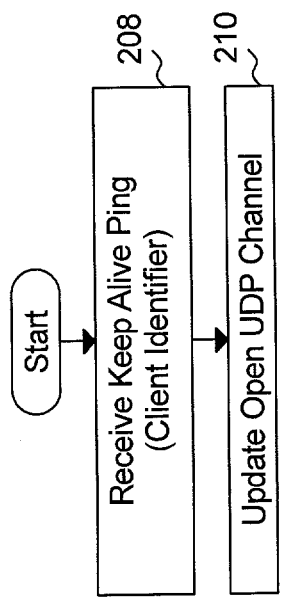
FIGS. 4a and 4b are flow charts showing exemplary operation of a client registration application in accordance with one embodiment of the present invention.
Figure 4A:
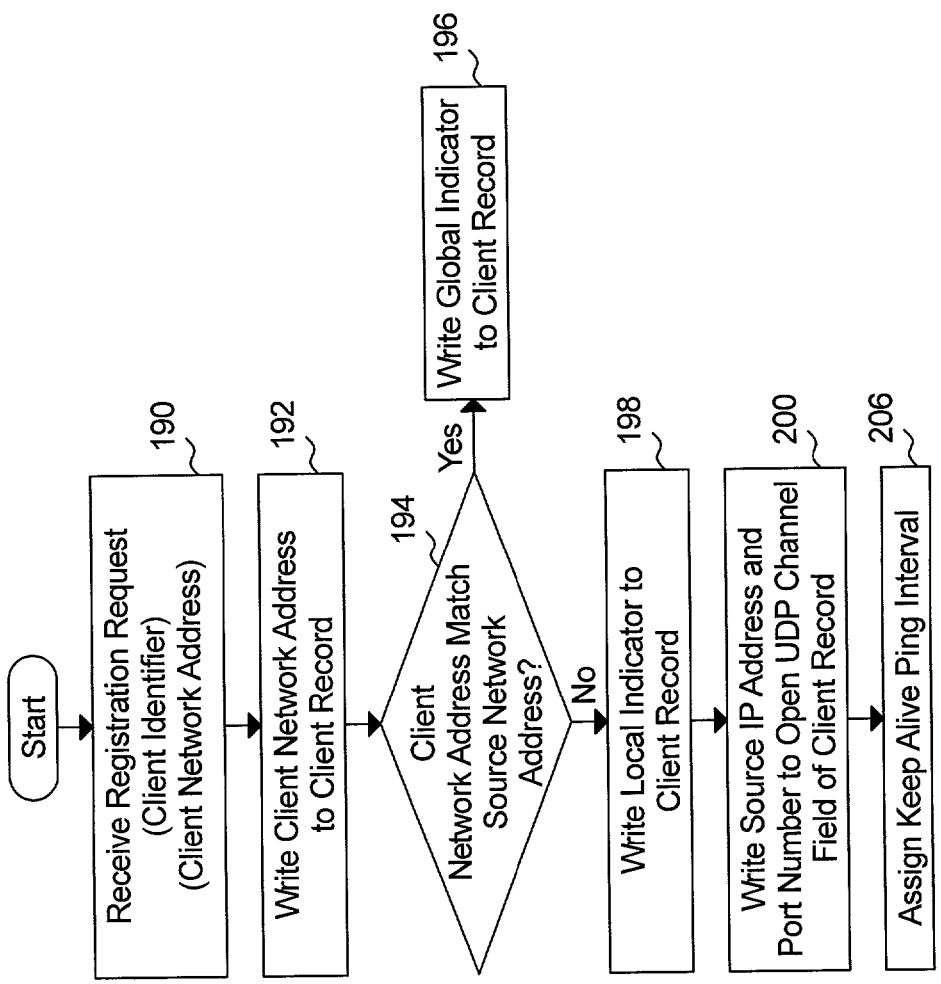

To maintain the client table database 42, the client registration server application 40 operates in accordance with the flowcharts of FIGS. 4a and 4b. Referring to the flowchart of FIG. 4a in conjunction with FIG. 3a, steps performed by the client registration server application 40 upon receipt of a registration request from a client that has just logged onto the network are shown. Step 190 represents receipt of such a request. The request will include the client identifier and will include the client's current network address. In the case of client 14, this will be a globally unique network address and in the case of clients 16 and 18 this will be a local network address that is routable only on the private network 24 and 26 respectively.

Step 192 represents writing the client network address to field 184 in the record associated with the client as identified by the client identifier field 180.

Step 194 represents extracting the source network address of the UDP/IP or TCP/IP datagram that encapsulated the registration request and determining whether the client network address matches the extracted source network address. In the case of client 14 which is directly coupled to the internet, the two addresses will match. In the case of clients 14 and 16 the two addresses will not match because the client network address will be the clients local network address while the extracted source network address will be the globally unique network address of the NAT server 28 and 30 respectively.

If the addresses do match, step 196 represents writing a global indicator "G" to the local/global indicator field 186 in the client table database 42. If the addresses do not match, step 198 represents writing a local indicator "L" to the local/global indicator field 186 in the client table database 42.

Following step 198, step 200 represents writing the extracted source network address and an extracted port number to an open channel field 182 in the client table database 42. As discussed previously, each NAT server 28 and 30 will reverse translate a datagram that is received on the same port number on which a translated datagram was sent. As such, the directory server 38 may send a datagram to the extracted source address and extracted source port number and the NAT server will reverse translate the datagram and send it to the client on the private network.

Step 206 represents assigning a keep alive ping interval to the client. As discussed earlier, the NAT server will only reverse translate datagrams that are received within brief time window following the sending of the translated frame. The purpose of the ping interval is to set a time interval for the client to continually ping the directory server 38 so that the reverse channel through the NAT server remains open.

The Flowchart of FIG. 4b represents steps performed by the client registration server application 40 upon receipt of a ping message from the client. Step 208 represents receipt of such a message. The message includes the client identifier. Step 210 represents updating the open channel field 182 in the client table database 42 to reflect the source network address and the source port number extracted from a UDP datagram comprising the ping message.

Figure 5A:
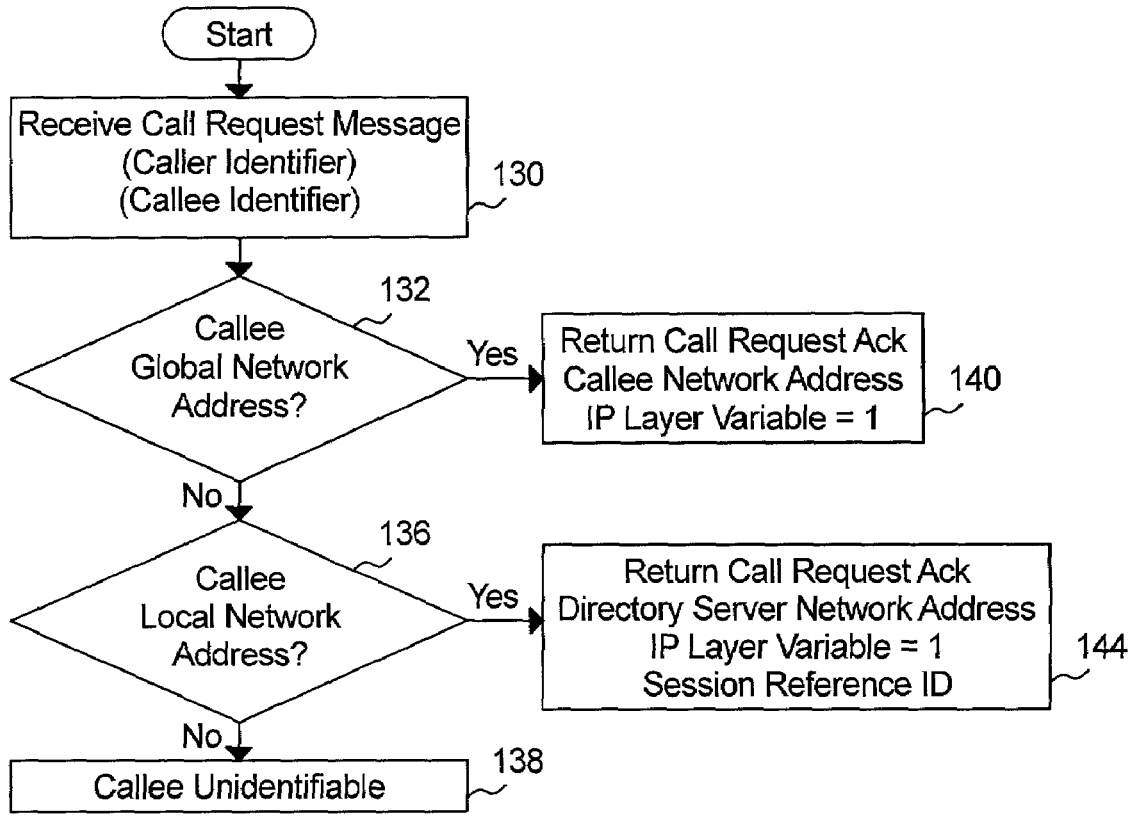
FIGS. 5a and 5b are flow charts showing exemplary operation of a directory server session set up application in accordance with one embodiment of the present invention.
Figure 5B:
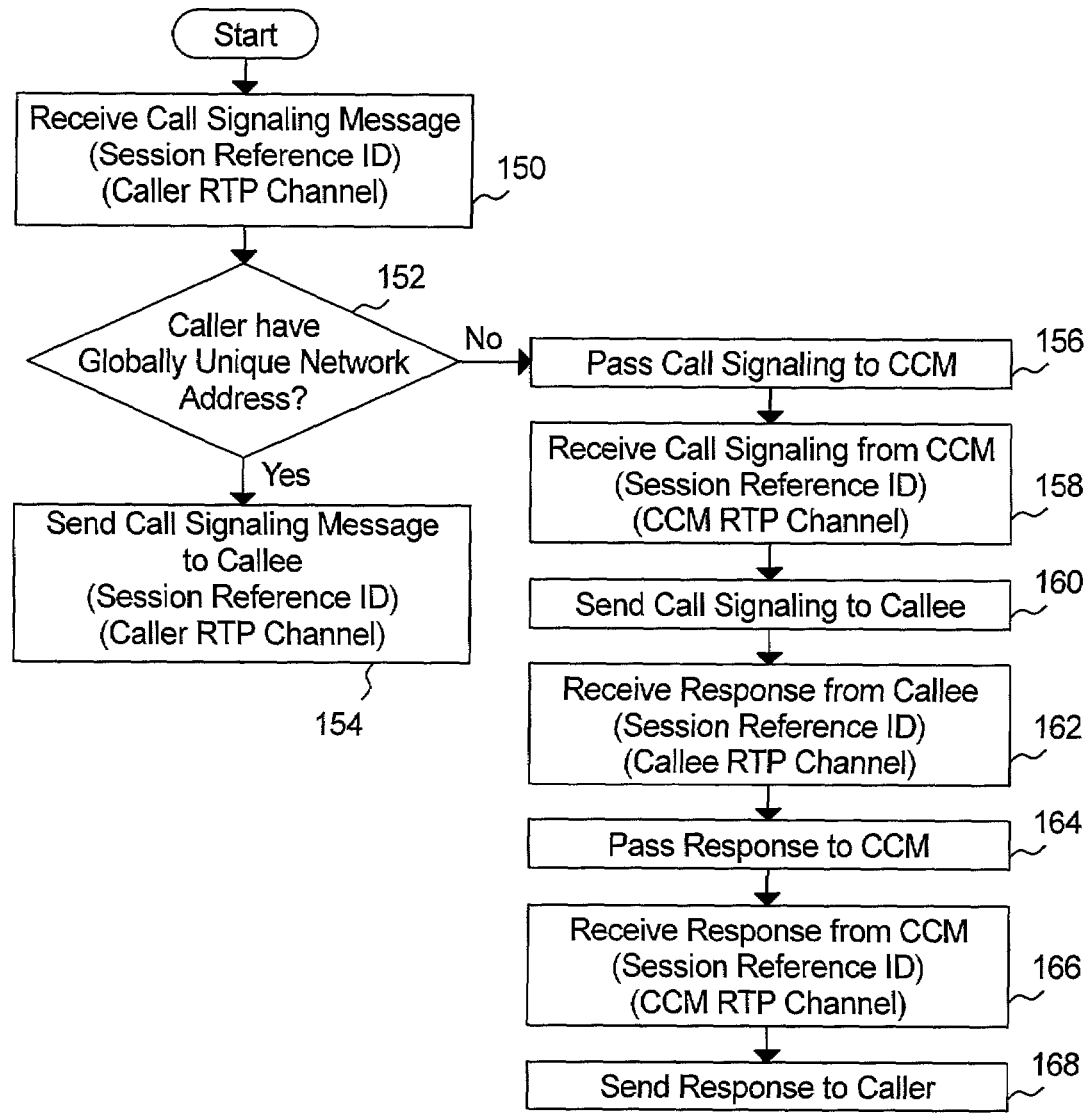

The flowcharts of FIG. 5a and 5b represent steps performed by the session set up server application 44 to facilitate media session signaling. Referring to FIG. 5a in conjunction with FIG. 3a, step 130 represents receipt of a call request message from a caller client. The call request message includes the caller identifier and the callee identifier. The session set up server application 44 returns different messages to the caller client based on the whether the callee client has a globally unique network address or a local network address. The callee client must be one of the above, if not the callee is unrecognized at step 138.

If the callee has a globally unique network address, the session set up server application 44 returns a call request acknowledge message to the caller client at step 140. The call request acknowledge message includes the callee network address (which is a globally unique network address) and an IP layer variable of 1.

If the callee has a local network address, the session set up server application 44 returns a call request acknowledge message to the caller client at step 144. The call request acknowledge message includes the network address of the directory server 38 (which is a globally unique network address), an IP layer variable of 1, and a session reference ID.

It should be appreciated that after receiving a call request acknowledge message in accordance with the above teachings, the caller client may initiate a call signaling message directly to the client if the client has a globally unique network address and to the directory server 38 if the callee client has a local network address.

The flowchart of FIG. 5b represents steps performed by the session set up server application 44 upon receipt of a call signaling message at step 150. The call signaling message will include the session reference ID provided to the caller client in the call request acknowledge message and will include the caller RTP channel for the session. The caller RTP channel will include the network address of the caller client (whether local or globally unique) and a port number established by the caller client for the session.

Step 152 represents determining whether the caller has a globally unique network address by comparing the network address provided by the caller client at step 150 to a source network address extracted from a datagram originated by the caller client when sending the call signaling message.

If the two network addresses are the same, then the caller client has a globally unique network address and the session set up server 44 forwards the call signaling message to the callee at step 154 utilizing the open channel to the callee client as determined by referencing the open channel field 182 in the client table database 42. The call signaling message forwarded at step 154 includes the session reference ID and includes the caller RTP channel.

If the two network addresses are not the same, then the caller client has a local network address and the session set up server 44 forwards the call signaling message to the call control manager 36 at step 156. Step 158 represents receiving a call signaling message back from the call control manager 36 at step 158. The signaling message received back from the call control manager 36 at step 158 will include the session reference ID and include a CCM RTP channel. The CCM RTP channel will include the globally unique network address of the call control manager 36 and a port number established by the call control manager 36 for the session.

Step 160 represents forwarding the call signaling message received at step 158 to the callee client utilizing the open channel to the callee client. Step 162 represents receiving a response message from the callee. The response message will include the session reference ID and will include a callee RTP channel. The callee RTP channel includes the network address of the callee client (local network address) and a port number established by the callee for the session.

Step 162 represents passing the response message received at step 162 to the call control manager 36 and step 166 represents receiving a response message back from the call control manager 36. The response back from the call control manager at step 166 includes the session reference ID and the CALL CONTROL MANAGER RTP channel established by the call control manager 36 for the session.

Step 168 represents sending the response to the caller client utilizing the open channel to the caller client.

Call Control Manager

Figure 3B:
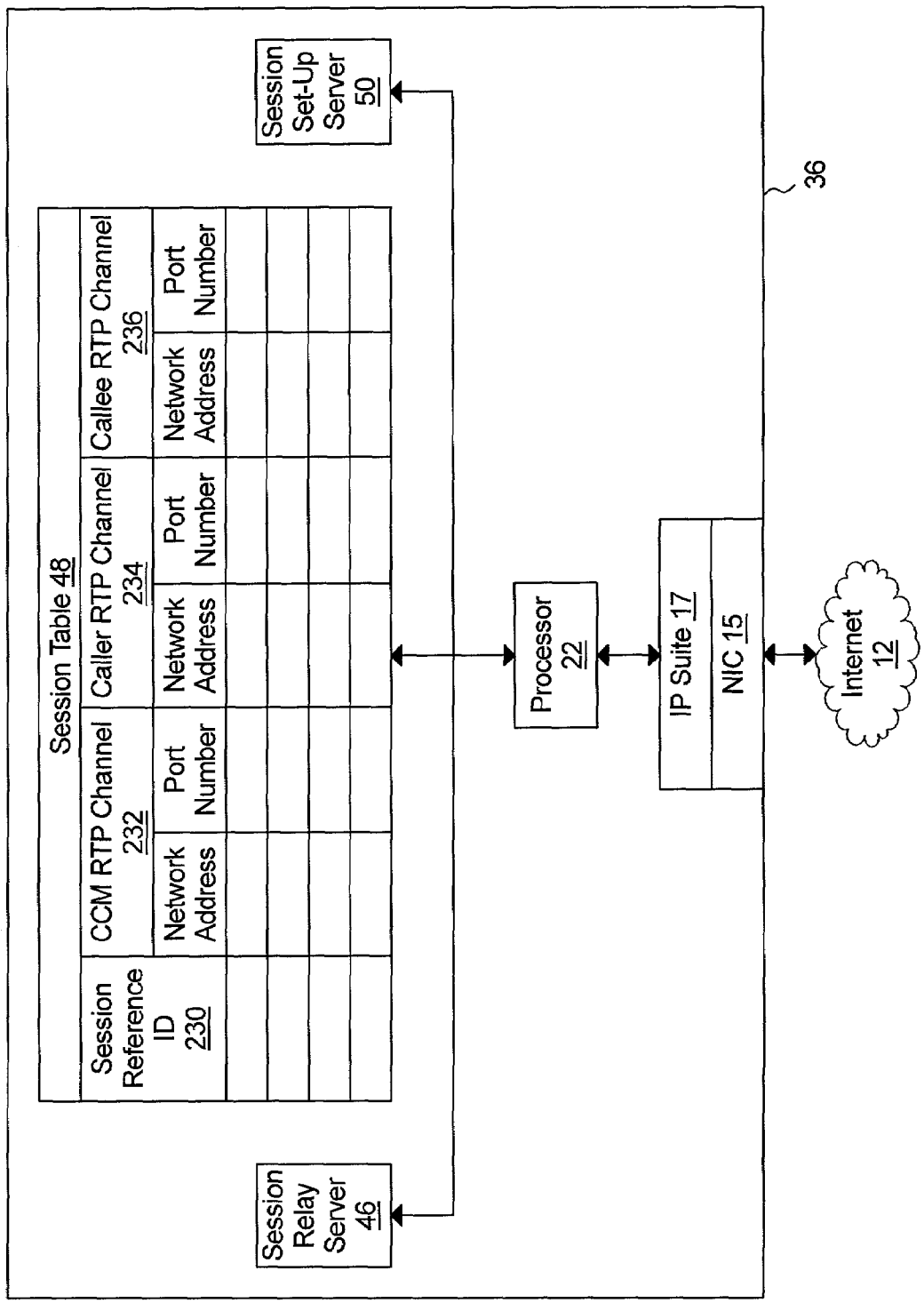
FIG. 3b is a block diagram of a call control manager in accordance with one embodiment of the present invention.

FIG. 3b is a block diagram representing an exemplary call control manager 36. The call control manager 36, like the directory server 38, may be embodied in typical server hardware that includes a processor 22 for operating a session relay server application 46, a session database application 48, and a session set up server 50 as well as operating an IP suite 17 and a network interface circuit 15 for communicating with other devices coupled to the Internet 12. It is envisioned that the structure of the call control manager 36 and the directory sever 38 may be operating on two separate hardware systems coupled by a local area network or through the Internet. It is also envisioned that the call control manager 36 and the directory server 38 may be implemented on the same hardware system.

Figure 6:
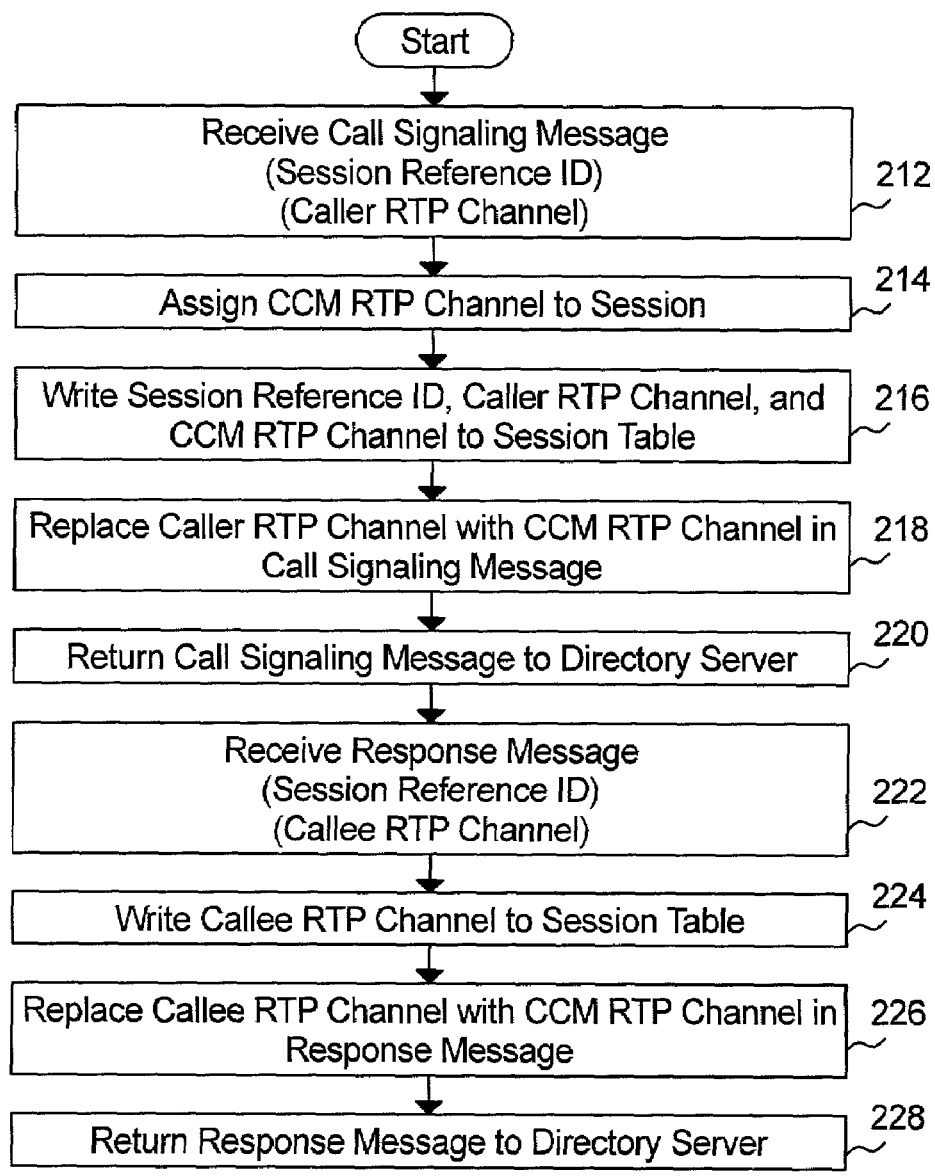
FIG. 6 is a flow chart showing exemplary operation of a call control manager session set up server application in accordance with one embodiment of the present invention.

The flowchart of FIG. 6 represents steps performed by the session set up server 50 in response to receiving a call signaling message from the directory server (e.g. step 156 of the flowchart of FIG. 5b). Step 212 represents receiving the call signaling message that includes the session reference ID and the caller RTP channel. Step 214 represents assigning a port number to the session to establish the CCM RTP channel that includes the network address for the call control manager 36 and the port number established for the session. Step 216 represents writing the session reference ID, the caller RTP channel, and the CCM RTP channel (or at least the port number) to fields 230, 234, and 232 of the session table 48 respectively.

Step 218 represents replacing the caller RTP channel with the CCM RTP channel in the call signaling message and step 220 represents returning the call signaling message to the directory server (e.g. step 158 of the flowchart of FIG. 5b).

Step 222 represents receiving the response message from the directory server (e.g. step 164 of FIG. 6b) that includes the session reference ID and the callee RTP channel. Step 124 represents writing the callee RTP channel to field 236 of the session table 48.

Step 226 represents replacing the callee RTP channel with the CCM RTP channel in the response message and step 228 represents returning the response message to the directory server (e.g. step 166 of the flowchart of FIG. 5b).

Figure 7:
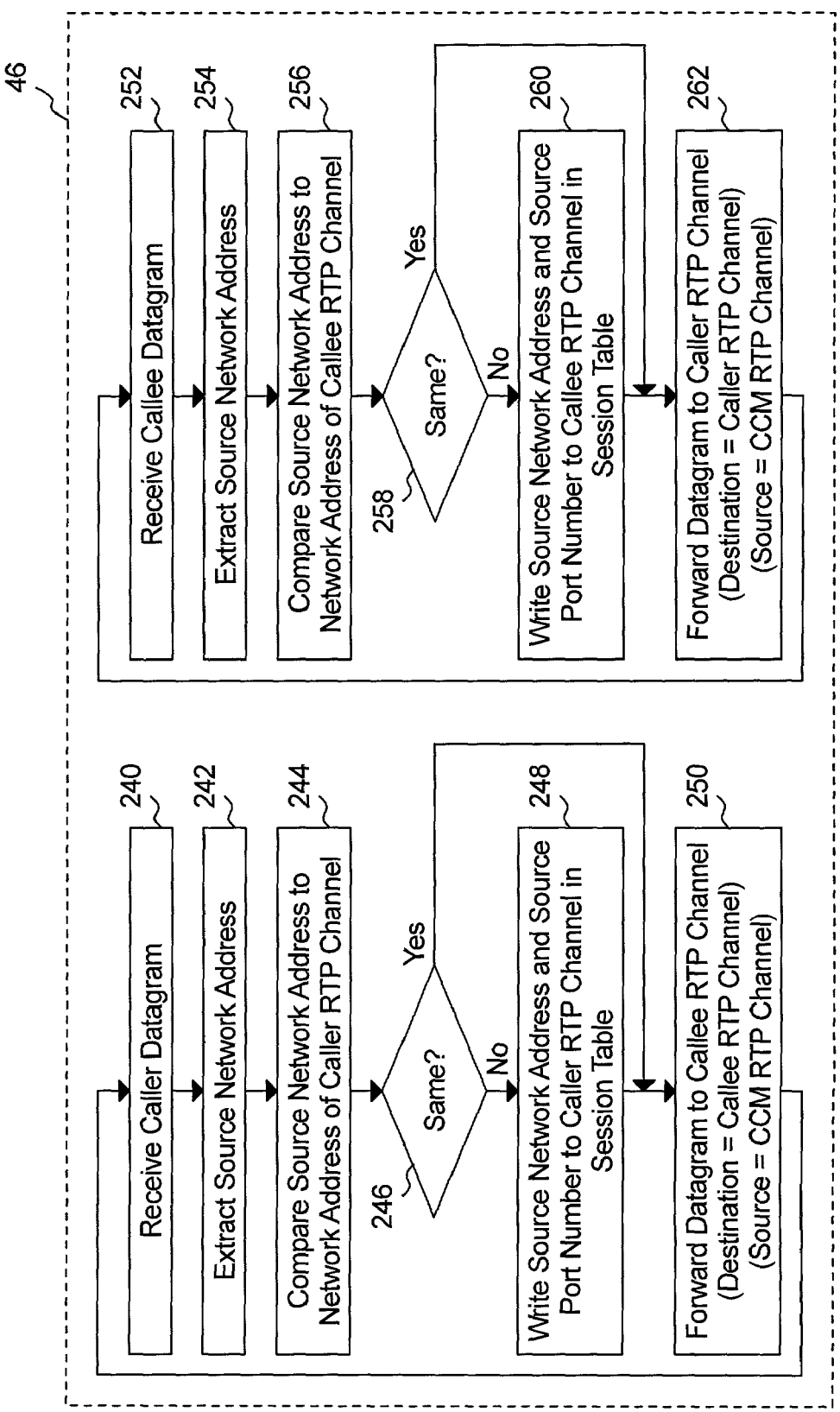
FIG. 7 is a flow chart showing exemplary operation of a session relay server in accordance with one embodiment of the present invention.

Following the completion of the steps of the flowcharts of FIG. 5b and FIG. 6, the caller client and the callee client will begin originating real time media frames addressed to the CCM RTP channel. The flow chart of FIG. 7 represents steps performed by the session relay server 46 to relay time media frames between a caller client and a callee client when both clients are served by NAT servers.

Step 240 represents receiving a datagram that embodies at least a portion of a real time media frame originated by the caller. Step 242 represents extracting the source network address from the datagram and step 244 represents comparing the extracted source network address to the network address of the caller RTP channel. If at step 246 the two are not the same, step 248 represents writing the extracted source network address and an extracted port number to the caller RTP channel field 234 in the session table 48. Step 250 represents forwarding the datagram to the callee utilizing the callee RTP channel for the destination address and the CCM RTP channel for the source address. It should be appreciate that because the datagram comprises real time media data, forwarding the datagram to the callee at step 250 may be performed simultaneously with the steps 242 through 248, or prior to performing steps 242 through 248. It should also be appreciated that steps 242 through 248 do not need to be performed on each datagram, but only need to be performed on a periodic basis.

Similarly step 252 represents receiving a datagram that embodies at least a portion of a real time media frame originated by the callee. Step 254 represents extracting the source network address from the datagram and step 256 represents comparing the extracted source network address to the network address of the callee RTP channel. If at step 258 the two are not the same, step 260 represents writing the extracted source network address and an extracted port number to the callee RTP channel field 236 in the session table 48. Step 262 represents forwarding the datagram to the caller utilizing the caller RTP channel for the destination address and the CCM RTP channel for the source address. Again, it should be appreciate that because the datagram comprises real time media data, forwarding the datagram to the caller at step 262 may be performed simultaneously with, or prior to, performing steps 254 through 260 and steps 254 through 250 , or prior to performing steps 254 through 260.

Clients

Figure 8:
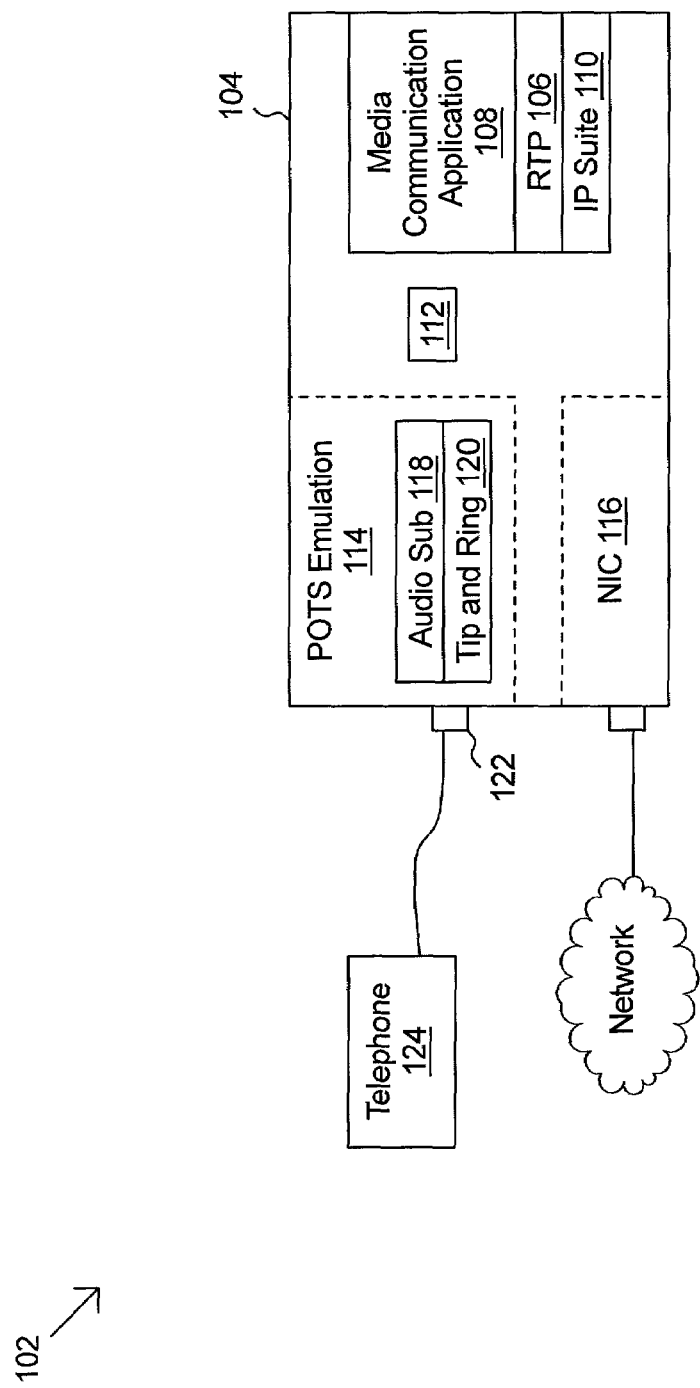
FIG. 8 is a block diagram of a real time streaming media client in accordance with one embodiment of the present invention.

Referring to FIG. 8, a block diagram of an exemplary client 102 is shown. The structure of client 102 is applicable for client 14, 16 or 18 of FIG. 1. The client 102 may include a desk top computer 104 and a traditional plain old telephone server (POTS) telephone 124 coupled thereto. The desk top computer 104 may include a processor 112 for operating a real time streaming media application 108, a real time transport protocol engine 106, an IP suite 110 and a network interface circuit 116 for communicating with other devices coupled to the network. The processor 112 may also operate a POTS emulation circuit 114.

The POTS emulation circuit 114 includes an RJ-11 female jack 122 for coupling the POTS telephone 124 to the POTS emulation circuit 114. The POTS emulation circuit 114 comprises a tip and ring emulation circuit 120 for emulating low frequency POTS signals on the POTS tip and ring lines for operating the telephone 124. The POTS emulation circuit 114 further includes an audio system 118 for interfacing the tip and ring emulation circuit 120 with the media communication application 108. More specifically, the audio system 118 provides for digitizing analog audio signals generated by the microphone in the telephone 124 (and provided to the POTS emulation circuit 114 on the tip and ring lines) and presenting a digital audio signal to the media communication application 108 (preferably by writing the digital audio data to memory using direct memory access systems). The audio system 118 simultaneously provides for receiving a digital audio signal from the media communication application 108, converting the digital audio signal to an analog audio signal, and coupling the analog audio signal to the tip and ring emulation circuit 120. The tip and ring emulation circuit 120 modulates the tip and ring lines for driving the speaker of the telephone 124 in accordance with the analog audio signal generated by the audio system 118.

In addition to client 102 being implemented in a desk top computer 104 and a telephone 124, other configurations of a client 102 are envisioned which include all of the above systems embedded therein. Other configurations include, but are not limited to, an Internet telephony appliance structured as a network interface home telephone, a gaming device, or another consumer product with Internet telephony capabilities coupled to the Internet 12 (FIG. 1) via a wired or wireless connection such as the cellular telephone network, the PCS network, or other wide area RF network.

Referring to the flowchart of FIG. 9a in conjunction with FIG. 8, steps performed by the media communication application 108 to initiate a real time media session with another client are shown. Step 270 represents establishing a caller RTP channel (or at least a port number) for the media session. Step 272 represents sending the call request message to the directory server 38 (e.g. step 130 of FIG. 5a) and step 274 represents receiving the call request acknowledge back from the directory server 38 (e.g. step 140, 142, or 144 of FIG. 5a).

After receiving the call request acknowledge at step 274, the media communication application 108 sends the call signaling message to the network address designated in the call request acknowledge message at step 276. It should be appreciated that if the callee has a globally unique network address, then the call request acknowledge would include the network address of the callee and the call signaling message sent at step 276 would go directly to the callee. If the callee does not have a globally unique network address but is served by a local call control manager, then the call request acknowledge would include the network address of the local call control manager and the call signaling message sent at step 276 would go directly to local call control manager. If the callee does not have a globally unique network address and is not served by a local call control manager, then the call request acknowledge would include the network address of the directory server 38 and the call signaling message sent at step 276 would go to the directory server 38.

Step 278 represents receiving the response message from either the callee client, the local call control manager, or the directory server 38 that includes the session reference ID and a designated RTP channel for sending real time streaming media frames.

The steps within box 280 represent steps performed during the media session. Step 282 represents sending datagrams representing real time streaming media frames to the designated RTP channel. Step 284 represents receiving datagrams representing real time streaming media frames on the caller RTP channel established at step 270. Because the designated RTP channel may include a local network address of the callee (in a case where the caller has a globally unique network address and the callee has a local network address) frames sent to the designated RTP channel will not reach the callee. As such, at step 286, the media communication application 108 extracts the source network address from a datagram received on the caller RTP channel. At step 288, the media communication application compares the extracted source network address to the network address of the designated RTP channel. If the two are not the same, the media communication application 108 updates the designated RTP channel to reflect the extracted source network address and an extracted source port number at sep 290.

Similarly, the flowchart of FIG. 9b represents steps performed by the media communication application when operating as a callee. Step 292 represents receiving a call signaling message that includes a designated RTP channel. The designated RTP channel may be that of the caller client if the caller client has a globally unique network address or may be the CCM RTP channel if caller client has a local network address.

Step 294 represents establishing a callee RTP channel for the session or at least a port number for the session and step 296 represents returning a response message that includes the callee RTP channel. Step 298 represents the media session that includes the steps discussed with reference to FIG. 9b.

In summary, the above described systems and methods provide for real time media communication between two clients if one or both of the clients have a private network address and are coupled to the Internet by a firewall server performing address translation and port translation.

It should be appreciated that the systems and methods provided operate in conjunction with any call signaling protocols and media session compression protocols recognized by each client. Such protocols include, but are not limited to, the ITU protocols and the IETF protocols discussed above. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A system for sending media session datagrams representing real time streaming media frames to a caller client independent of whether the caller client is served by a network address translation proxy, the system comprising:
   a directory server:
      receiving a registration request originated by the caller client;
      extracting a source network address and a source port number from the registration request to identify an open signaling channel to the caller client from the directory server that can be reverse translated by the network address translation proxy;
      receiving a media session signaling request originated by the caller client;
      obtaining a real time protocol channel from a call control manager;
      returning a response signal to the caller client on the open signaling channel, the response signal including the real time protocol channel of the call control manager; and
   the call control manager:
      providing the real time protocol channel to the directory server;

receiving a media session datagram from the caller client to the real time protocol channel;

extracting a source network address and a source port number from the media session datagram to identify an open media channel to the caller client from the call control manager that can be reverse translated by the network address translation proxy; and relaying media session datagrams received from a callee client to the caller client on the open media channel.

2. The system of claim 1, wherein the directory server further:

writes the extracted source network address and port number to an open signaling channel field of a client database;

periodically receives a UDP datagram comprising a ping message from the caller client; and updates the network address and port number stored in the open signaling channel field in the client database to reflect a source network address and source port number extracted from the UDP datagram; and returning the response signal to the caller client on the open signaling channel comprises looking up the network address and port number of the open signaling channel in the client database.

3. A system for sending media session datagrams representing real time streaming frames to a caller client independent of whether the caller client is served by a network address translation proxy, the system comprising:

a directory server:

periodically receiving a UDP datagram comprising a ping message from the caller client;

updating an open signaling channel field in a client database to reflect a source network address and a source port number extracted from the UDP datagram;

receiving a media session signaling request originated by the caller client;

obtaining a real time protocol channel from a call control manager;

returning a response signal to the caller client on the open signaling channel field associated with the caller client in the client database, the response signal including the real time protocol channel of the call control manager; and the call control manager:

providing the real time protocol channel to the directory server;

receiving a media session datagram from the caller client to the real time protocol channel;

extracting a source network address and a source port number from the session datagram to identify an open media channel to the caller client form the call control manager that can be reverse translated by the network address translation proxy; and relaying media session datagram received from a callee client to the caller client on the open media channel.

4. A system for sending media session datagrams representing real time streaming frames to a caller client independent of whether the caller client is served by a network address translation proxy, the system comprising:

a directory server:

receiving a registration request originated by the caller client extracting a source network address and a source port number from the registration request;

if the extracted source network address matches a client network address of the registration request, determining that the caller client is not served by a network address translation firewall and recording such determination in a client database;

if the extracted source network address is different than a client network address of the registration request, determining that the caller client is served by a network address translation firewall and recording the extracted source network address and source port number in the client database;

receiving a media session signaling request originated by the caller client;

obtaining a real time protocol channel from a call control manager;

returning a response signal to the caller client on the open signaling channel recorded in the client database, the response signal including:

the real time protocol channel of the call control manager if the record in the client database indicates that the caller client is served by a network address translation firewall; and a real time protocol channel of a callee client identified in the media session signaling request if the record in the client database indicates that the caller client is not served by a network address translation firewall; and the call control manager:

providing the real time protocol channel of the call control manager to the directory server;

receiving a media session datagram addressed to the real time protocol channel of the call control manager by the caller client;

extracting a source network address and a source port number from the media session datagram to identify an open media channel to the caller client from the call control manager that can be reverse translated by the network address translation proxy; and relaying media session datagrams received from the callee client to the caller client on the open media channel.

5. A system for sending media session datagrams representing real time streaming frames to a caller client independent of whether the caller client is served by a network address translation proxy, the system comprising:

a directory server:

receiving a registration request originated by the caller client;

extracting a source network address and a source port number from the registration request;

if the extracted source network address matches a client network address of the registration request, determining that the caller client is not serviced by a network address translation firewall and recording such determination in a client database;

if the extracted source network address is different than a client network address of the registration request, determining that the caller client is served by a network address translation firewall and recording the extracted source network address and source port number in the client database as an open signaling channel to the caller client;

periodically receiving a UDP datagram comprising a ping message from the caller client;

updating the open signaling channel to the caller client in the client database to reflect a source network address and a source port number extracted from the UDP datagram;
receiving a media session signaling request originated by the caller client;
obtaining a real time protocol channel from a call control manager;
returning a response signal to the caller client on the open signaling channel recorded in the client database, the response signal including:
the real time protocol channel of the call control manager if the record in the client database indicates that the caller client is served by a network address translation firewall; and
a real time protocol channel of a callee client identified in the media session signaling request if the record in the client database indicates that the caller client is not served by a network address translation firewall; and
the call control manager:
providing the real time protocol channel of the call control manager to the directory server;
receiving a media session datagram addressed to the real time protocol channel of the call control manager by the caller client;
extracting a source network address and a source port number from the media session datagram to identify an open media channel to the caller client from the call control manager that can be reverse translated by the network address translation proxy; and
relaying media session datagrams received from the callee client to the caller client on the open media channel.

6. A method for sending media session datagrams representing real time streaming frames to a caller client independent of whether the caller client is served by a network address translation proxy, the method comprising:
operating a directory server for:
receiving a registration request datagram originated by the caller client;
extracting a source network address and a source port number from the registration request to identify an open signaling channel to the caller client from the directory server that can be reverse translated by the network address translation proxy;
receiving a media session signaling request originated by the caller client;
obtaining a real time protocol channel from a call control manager;
returning a response signal to the caller client on the open signaling channel, the response signaling including the real time protocol channel of the call control manager; and
operating the call control manager for:
providing the real time protocol channel to the directory server;
receiving a media session datagram from the caller client to the real time protocol channel;
extracting a source network address and a source port number from the media session datagram to identify an open media channel to the caller client from the call control manager that can be reverse translated by the network address translation proxy; and
relaying media session datagrams received from a callee client to the caller client on the open media channel.

7. The method of claim 6, wherein the directory server further:
writes the extracted source network address and port number to an open signaling channel field of a client database;
periodically receives a UDP datagram comprising a ping message from the caller client; and
updates the network address and port number stored in the open signaling channel field in the client database to reflect a source network address and source port number extracted from the UDP datagram; and
returning the response signal to the caller client on the open signaling channel comprises looking up the network address and port number of the open signaling channel in the client database.

8. A method for sending media session datagrams representing real time streaming frames to a caller client independent of whether the caller client is served by a network address translation proxy, the method comprising:
operating a directory server for:
periodically receiving a UDP datagram comprising a ping message from the caller client;
updating an open signaling channel field in a client database to reflect a source network address and a source port number extracted from the UDP datagram;
receiving a media session signaling request originated by the caller client;
obtaining a real time protocol channel from a call control manager;
returning a response signal to the caller client on the open signaling channel associated with the caller client in the client database the response signal including the real time protocol channel of the call control manager; and
operating the call control manager for:
providing the real time protocol channel to the directory server;
receiving a media session datagram originated by the caller client that includes a real time streaming media frame;
extracting a source network address and a source port number from the media session datagram originated by the client to identify an open media channel to the caller client from the call control manager that can be reverse translated by the network address translation proxy; and
relaying media session datagrams received from a callee client to the caller client on the open media channel.

9. A method for sending media session datagrams representing real time streaming frames to a caller client independent of whether the caller client is served by a network address translation proxy, the method comprising:
operating a directory server for:
receiving a registration request datagram originated by the caller client;
extracting a source network address and a source port number from the registration request datagram;
if the extracted source network address matches a client network address of the registration request, determining that the caller client is not served by a network address translation firewall and recording such determination in a client database;
if the extracted source network address is different than a client network address of the registration request, determining that the caller client is served by a network address translation firewall and recording the extracted source network address and source port number in the client database;

receiving a media session signaling request originated by the caller client;

obtaining a real time protocol channel from a call control manager;

returning a response signal to the caller client on the open signaling channel recorded in the client database, the response signal including:

the real time protocol channel of the call control manager if the record in the client database indicates that the caller client is served by a network address translation firewall; and a real time protocol channel of a callee client identified in the media session signaling request if the record in the client database indicates that the caller client is not served by a network address translation firewall; and operating the call control manager for:

providing the real time protocol channel of the call control manager to the directory server;

receiving a media session datagram addressed to the real time protocol channel of the call control manager by the caller client;

extracting a source network address and a source port number from the media session datagram to identify an open media channel to the caller client from the call control manager that can be reverse translated by the network address translation proxy; and relaying media session datagrams received from the callee client to the caller client on the open media channel.

10. A method for sending media session datagrams representing real time streaming frames to a caller client independent of whether the caller client is served by a network address translation proxy, the method comprising:

operating a directory server for:

receiving a registration request datagram originated by the caller client;

extracting a source network address and a source port number from the registration request;

if the extracted source network address matches a client network address of the registration request, determining that the caller client is not serviced by a network address translation firewall and recording such determination in a client database;

if the extracted source network address is different than a client network address of the registration request, determining that the caller client is served by a network address translation firewall and recording the extracted source network address and source port number in the client database as an open signaling channel to the caller client;

periodically receiving a UDP datagram comprising a ping message from the caller client;

updating the open signaling channel to the caller client in the client database to reflect a source network address and a source port number extracted from the UDP datagram;

receiving a media session signaling request originated by the caller client;

obtaining a real time protocol channel from a call control manager;

returning a response signal to the caller client on the open signaling channel recorded in the client database, the response signal including:

the real time protocol channel of the call control manager if the record in the client database indicates that the caller client is served by a network address translation firewall; and a real time protocol channel of a callee client identified in the media session signaling request if the record in the client database indicates that the caller client is not served by a network address translation firewall; and operating the call control manager for:

providing the real time protocol channel of the call control manager to the directory server;

receiving a media session datagram addressed to the real time protocol channel of the call control manager by the caller client;

extracting a source network address and a source port number from the media session datagram to identify an open media channel to the caller client from the call control manager that can be reverse translated by the network address translation proxy; and relaying media session datagrams received from the callee client to the caller client on the open media channel.

11. The system of claim 4, wherein, if the extracted source network address is different than a client network address of the registration request, the directory server further:

writes the extracted source network address and port number to an open signaling channel field of a client database;

periodically receives a UDP datagram comprising a ping message from the caller client; and updates the network address and port number stored in the open signaling channel field in the client database to reflect a source network address and source port number extracted from the UDP datagram; and returning the response signal to the caller client on the open signaling channel comprises looking up the network address and port number of the open signaling channel in the client database.

12. The method of claim 9, wherein, if the extracted source network address is different than a client network address of the registration request, the directory server further:

writes the extracted source network address and port number to an open signaling channel field of a client database;

periodically receives a UDP datagram comprising a ping message from the caller client; and updates the network address and port number stored in the open signaling channel field in the client database to reflect a source network address and source port number extracted from the UDP datagram; and returning the response signal to the caller client on the open signaling channel comprises looking up the network address and port number of the open signaling channel in the client database.

* * * * *